United States Patent
Kuo

(10) Patent No.: US 9,658,696 B2
(45) Date of Patent: May 23, 2017

(54) ELECTRONIC DEVICE AND METHOD FOR ADJUSTING USER INTERFACE OF THE ELECTRONIC DEVICE

(71) Applicant: FIH (Hong Kong) Limited, Kowloon (HK)

(72) Inventor: San-Hsin Kuo, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 395 days.

(21) Appl. No.: 14/312,844

(22) Filed: Jun. 24, 2014

(65) Prior Publication Data

US 2014/0380208 A1 Dec. 25, 2014

(30) Foreign Application Priority Data

Jun. 24, 2013 (TW) .................................. 102122427

(51) Int. Cl.
- *G06F 3/01* (2006.01)
- *G06F 3/0487* (2013.01)
- *G06F 3/0488* (2013.01)

(52) U.S. Cl.
CPC ............ *G06F 3/017* (2013.01); *G06F 3/0487* (2013.01); *G06F 3/04886* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,187,100 B1* | 5/2012 | Kahn | ...................... | H04L 67/10 463/42 |
| 9,436,269 B2* | 9/2016 | Yang | ...................... | G06F 1/3287 |
| 2013/0152001 A1* | 6/2013 | Lovitt | ................... | G06F 9/4443 715/765 |
| 2013/0227470 A1* | 8/2013 | Thorsander | ......... | G06F 3/04883 715/790 |
| 2015/0067601 A1* | 3/2015 | Bernstein | .............. | G06F 3/0488 715/823 |
| 2015/0074541 A1* | 3/2015 | Schwartz | .............. | H04L 67/025 715/740 |

* cited by examiner

*Primary Examiner* — Van Chow
(74) *Attorney, Agent, or Firm* — Steven Reiss

(57) ABSTRACT

A method for adjusting a location and a size of a user interface using an electronic device includes a three-axis acceleration sensor. The three-axis accelerometer is activated to detect three-axis acceleration values of the electronic device. A handheld gesture of the electronic device is determined according to the detected three-axis acceleration values. The method calculates a screen size of a touchscreen of the electronic device and calculates a reduction proportion for the user interface displayed on the touchscreen. A new location on the touchscreen for the user interface is determined according to the determined handheld gesture. The method further resizes the user interface according to the calculated reduction proportion, and adjusts a display of the resized user interface according to the confirmed new location.

12 Claims, 10 Drawing Sheets

| Screen size (S) | Reduction level (L) | Reduction proportion (P) |
|---|---|---|
| 4.6~4.89 | 0 | 80% |
| 4.9~5.19 | 1 | 75% |
| 5.2~5.49 | 2 | 70% |
| 5.5~5.79 | 3 | 65% |
| 5.8~6.09 | 4 | 60% |
| 6.1~6.39 | 5 | 55% |
| 6.4~6.69 | 6 | 50% |
| 6.7~6.89 | 7 | 45% |
| …… | …… | …… |
| S | L = (S - 4.6)/0.3 | P = 80% - 5% × L |

FIG. 10

ELECTRONIC DEVICE AND METHOD FOR ADJUSTING USER INTERFACE OF THE ELECTRONIC DEVICE

CROSS-REFERENCE TO RELATED APPLICATIONS

This application claims priority to Taiwanese Patent Application No. 102122427 filed on Jun. 24, 2013 in the Taiwan Intellectual Property Office, the contents of which are incorporated by reference herein.

FIELD

Embodiments of the present disclosure relate to user interface management and particularly to an electronic device and method for adjusting a user interface of the electronic device.

BACKGROUND

Screens of electronic devices (e.g. mobile phones) display data for viewing. Although an electronic device with a large screen can improve a user's visual experience, it can also be more difficult for the user to operate a large screen (e.g. a large touchscreen) using only one hand.

BRIEF DESCRIPTION OF THE DRAWINGS

Implementations of the present disclosure will be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

FIG. 10 is an isometric diagram of an embodiment of calculating a reduction proportion of a touchscreen.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references can mean "at least one," or "one or more."

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

Figure 1:
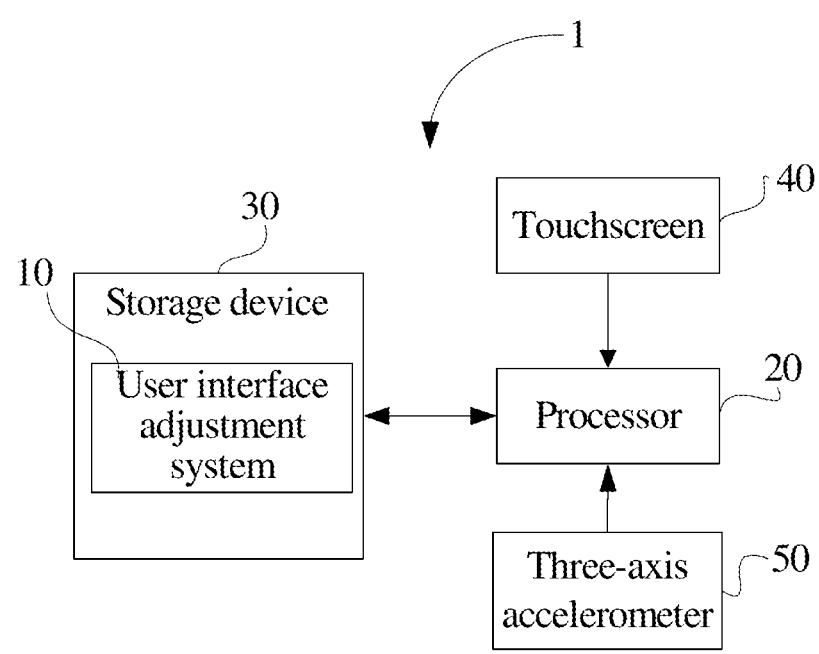
FIG. 1 is a block diagram of one embodiment of an electronic device including a user interface adjustment system.

FIG. 1 is a block diagram of one embodiment of an electronic device 1 including a user interface adjustment system 10. In one embodiment, the electronic device 1 can be a mobile phone, a tablet computer, a notebook computer, or any other electronic device. The electronic device 1 further includes, but is not limited to, at least one processor 20, a storage device 30, a touchscreen 40, and a three-axis accelerometer 50. The user interface adjustment system 10 can adjust a location and a size of a user interface of an application program in the electronic device 1 according to a movement of the hand of a user while holding the electronic device 1.

The at least one processor 20 executes one or more computerized codes and other applications of the electronic device 1 to provide functions of the user interface adjustment system 10. The storage device 30 can be a memory of the electronic device 1 or an external storage card, such as a smart media card or a secure digital card.

Figure 4:
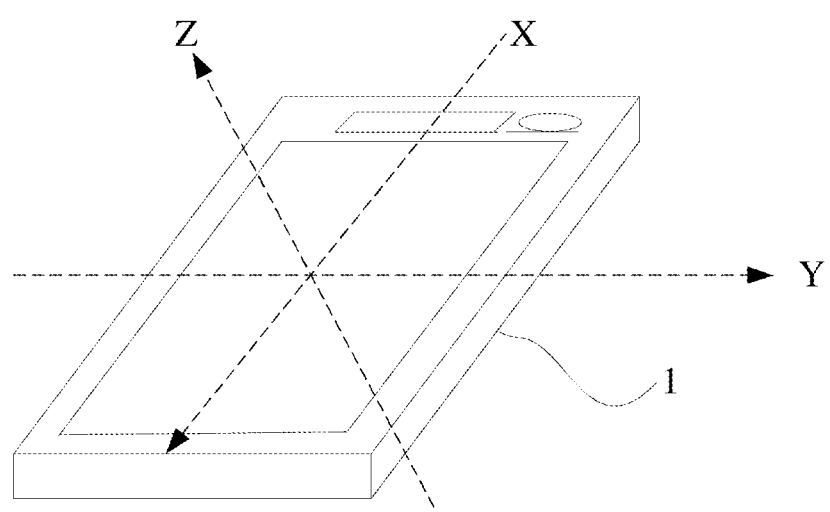
FIG. 4 is an isometric diagram of an embodiment of a coordinate system of a three-axis accelerometer in the electronic device of FIG. 1.
Figure 5:
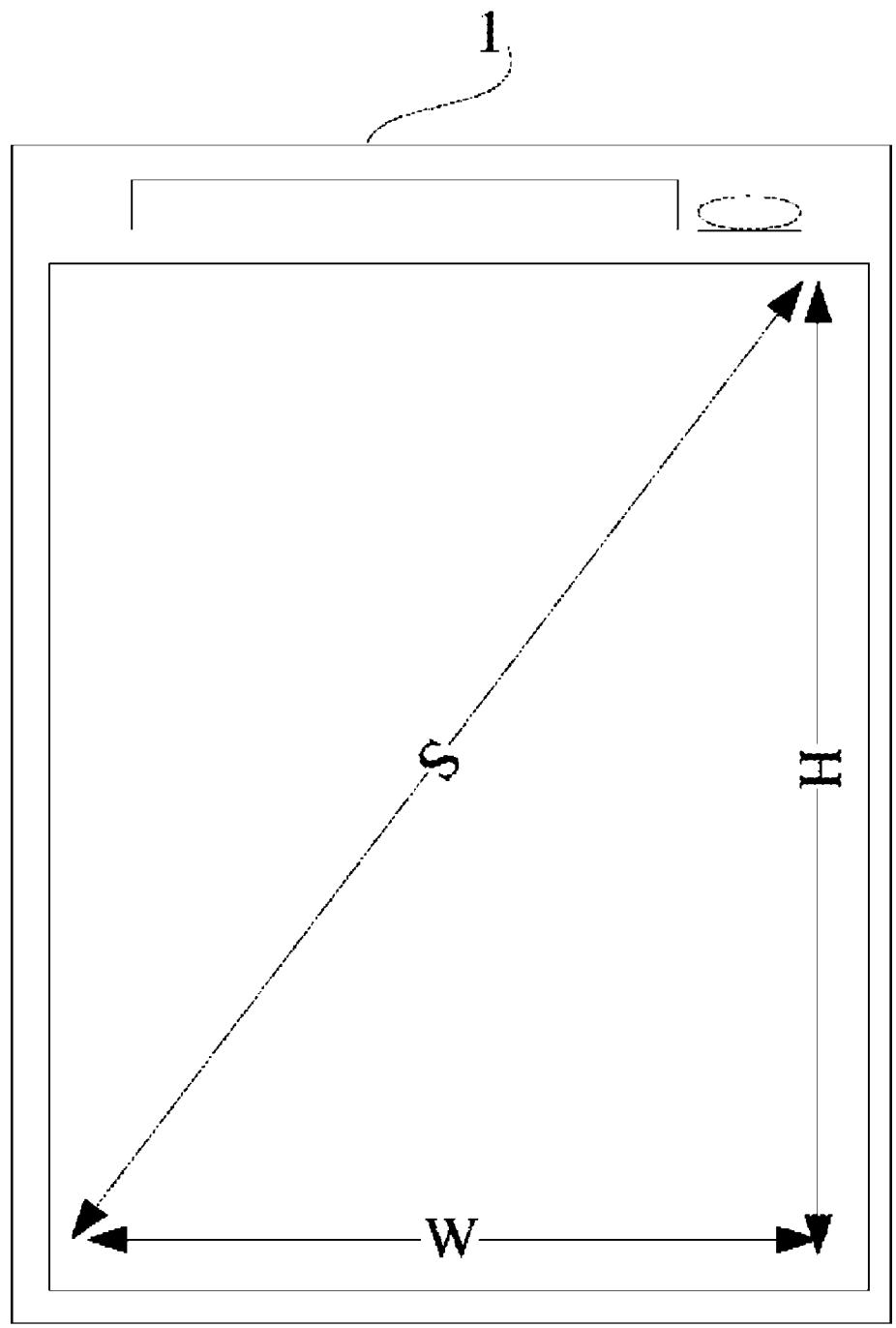
FIG. 5 is an isometric diagram of an embodiment of calculating a size of a touchscreen of the electronic device of FIG. 1.

The touchscreen 40 can be a capacitive touchscreen or a resistive touchscreen supporting touch operations of a finger or a stylus, for example. The screen size of the touchscreen 40 is described by a length of a diagonal of the touchscreen 40 (as shown in FIG. 5). The touchscreen 40 can display user interfaces of different application programs in the electronic device 1. The three-axis accelerometer 50 can detect three-axis acceleration values of the electronic device 1, such as the three-axis acceleration values respectively along an x-axis, a y-axis, and a z-axis based on a preset coordinate system (as shown in FIG. 4) of the electronic device 1.

Figure 2:
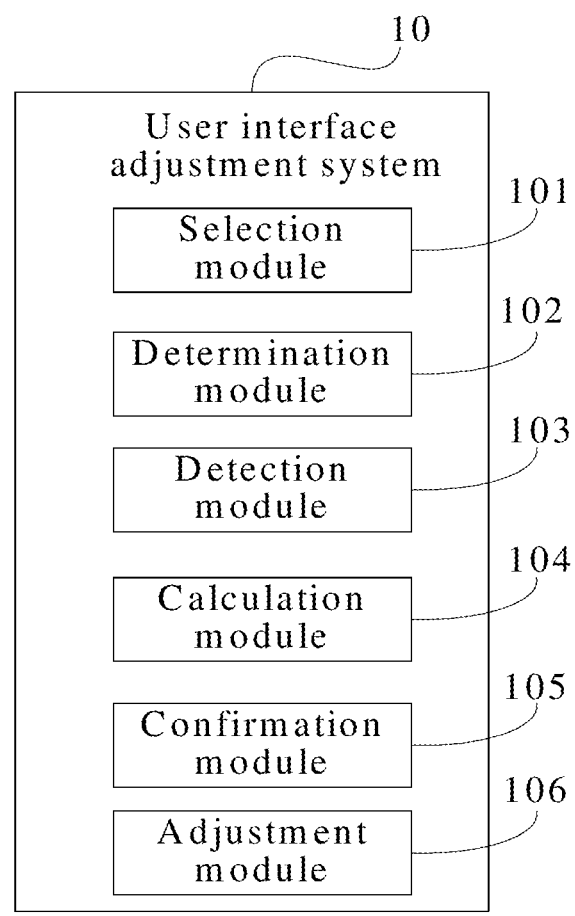
FIG. 2 is a block diagram of one embodiment of function modules of the user interface adjustment system of the electronic device in FIG. 1.

FIG. 2 is a block diagram illustrating function modules of the user interface adjustment system 10. In this embodiment, the user interface adjustment system 10 includes a selection module 101, a determination module 102, a detection module 103, a calculation module 104, a confirmation module 105, and an adjustment module 106. The modules 101-106 include computerized code in the form of one or more programs that are stored in the storage device 30. The computerized code includes instructions that are executed by the at least one processor 20 to provide functions of the user interface adjustment system 10.

Figure 3:
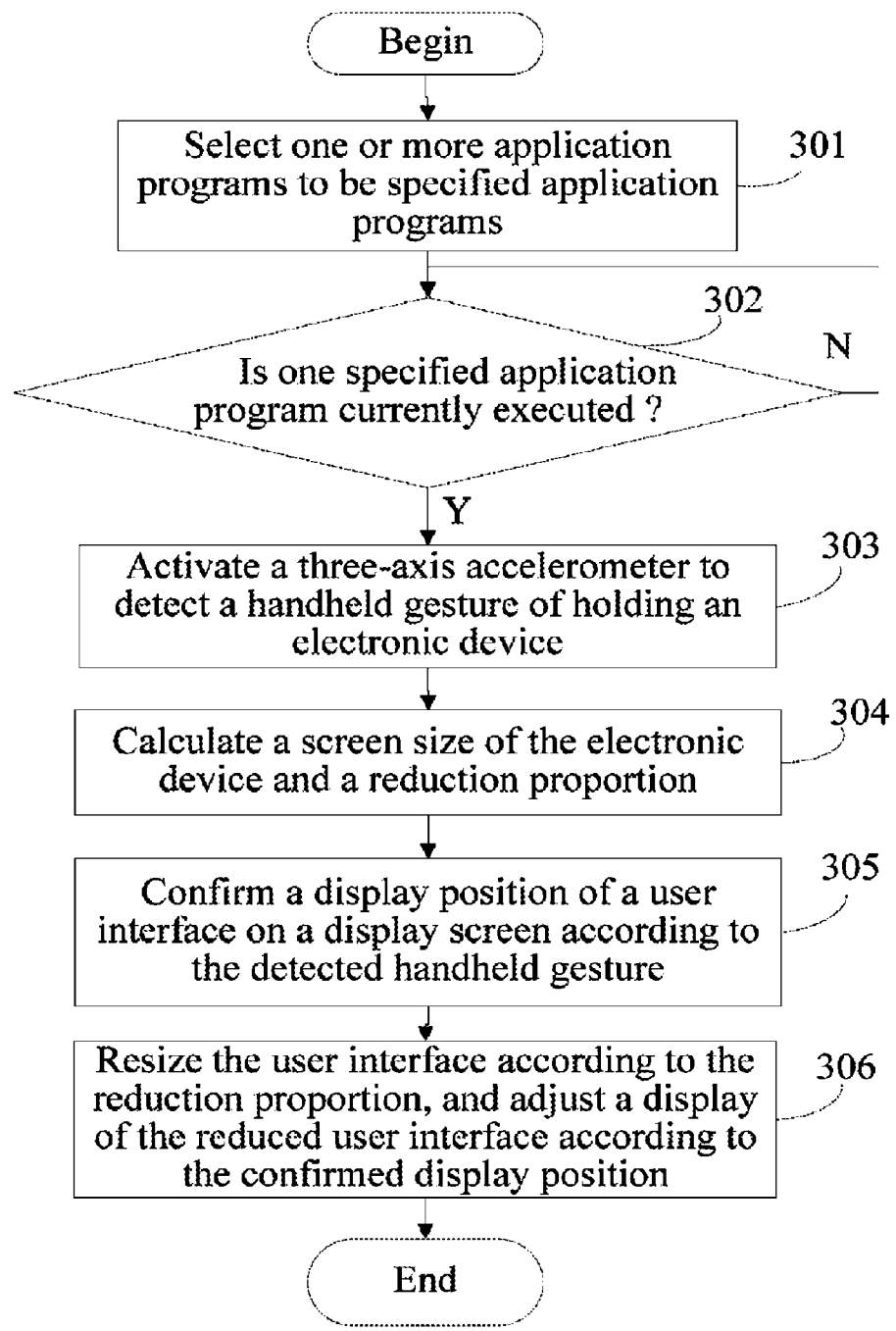
FIG. 3 is a flowchart of one embodiment of a method for adjusting a user interface appearing on the electronic device of FIG. 1.

FIG. 3 is a flowchart of one embodiment of a method for adjusting user interface of the electronic device. Depending on the embodiment, additional blocks can be added, others can be removed, and the ordering of the blocks can be changed.

In block 301, the selection module 101 selects one or more application programs in the electronic device 1 as specified application programs of which the user interfaces are required to be adjusted by enabling an adjustment function. In some embodiments, if the user wants to operate a user interface of an application program with one hand, the user can select the application program to be a specified application program using the selection module 101. After at least one specified application program is selected, the user interface adjustment system 10 can adjust a display of the user interface of the specified application program according to a movement of the hand while holding the electronic device (handheld gesture) of the user.

In one embodiment, the user may click, press, or drag on one area of the user interface of the specified application program using fingers or stylus. For example, the user interface may be a dialing interface of a telephone communication application (e.g. a user interface as marked "107" in FIG. 6), a virtual keyboard interface of an input application, a graphical user interface of a set of applications, or a user interface of a calculator application, for example.

In block 302, the determination module 102 determines whether one specified application program is being executed in the electronic device 1. When one specified application is being executed in the electronic device 1, block 303 is implemented. Whilst no specified application program is being executed in the electronic device 1, block 302 is repeated.

In block 303, the detection module 103 activates the three-axis accelerometer 50 to detect three-axis acceleration values of the electronic device 1, and determines a handheld gesture of the user holding the electronic device 1 according to the detected three-axis acceleration values. FIG. 4 is an isometric diagram of an embodiment of a coordinate system of the three-axis accelerometer 50. The three-axis acceleration values may include, but are not limited to, an acceleration value "x" along the x-axis, an acceleration value "y" along the y-axis, and an acceleration value "z" along the z-axis. Each of the three-axis acceleration values can be positive or negative to reflect the actual handheld gesture.

Figure 6:
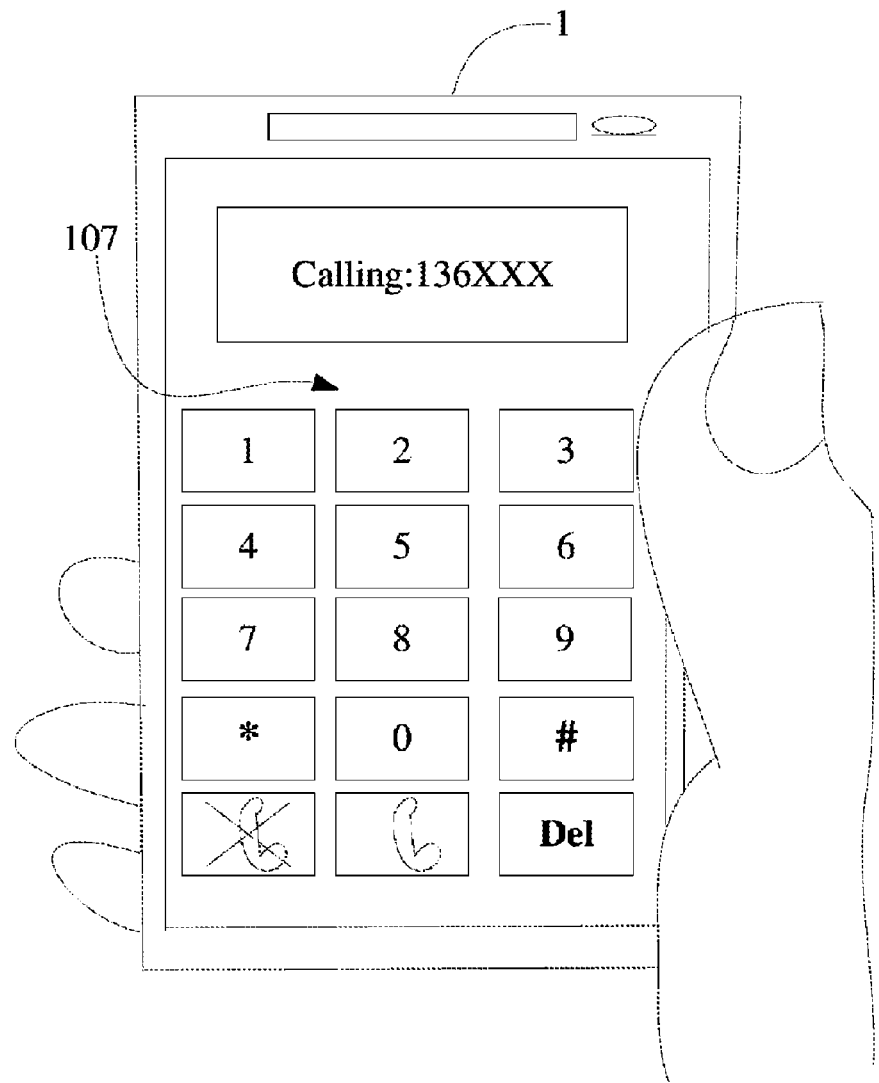
FIG. 6 is a first isometric diagram of an embodiment of displaying a dialing user interface for dialing telephone numbers when an electronic device is held vertically by the right hand of a user.

In one embodiment, the detection module 103 can determine the handheld gesture according to the acceleration values "x" and "y". There are at least four recognized handheld gestures. If the acceleration value "x" is greater than a first acceleration threshold (e.g. 1 m/s$^2$) and the acceleration value "y" is less than or equal to a second acceleration threshold (e.g. 1.2 m/s$^2$), a first handheld gesture that represents the electronic device 1 is vertically handheld by a right hand is determined (e.g. as shown in FIG. 6). If the acceleration value "x" is greater than or equal to the first acceleration threshold and the acceleration value "y" is less than a negative value of the second acceleration threshold, a second handheld gesture that represents the electronic device 1 is horizontally handheld by the right hand is determined.

Figure 8:
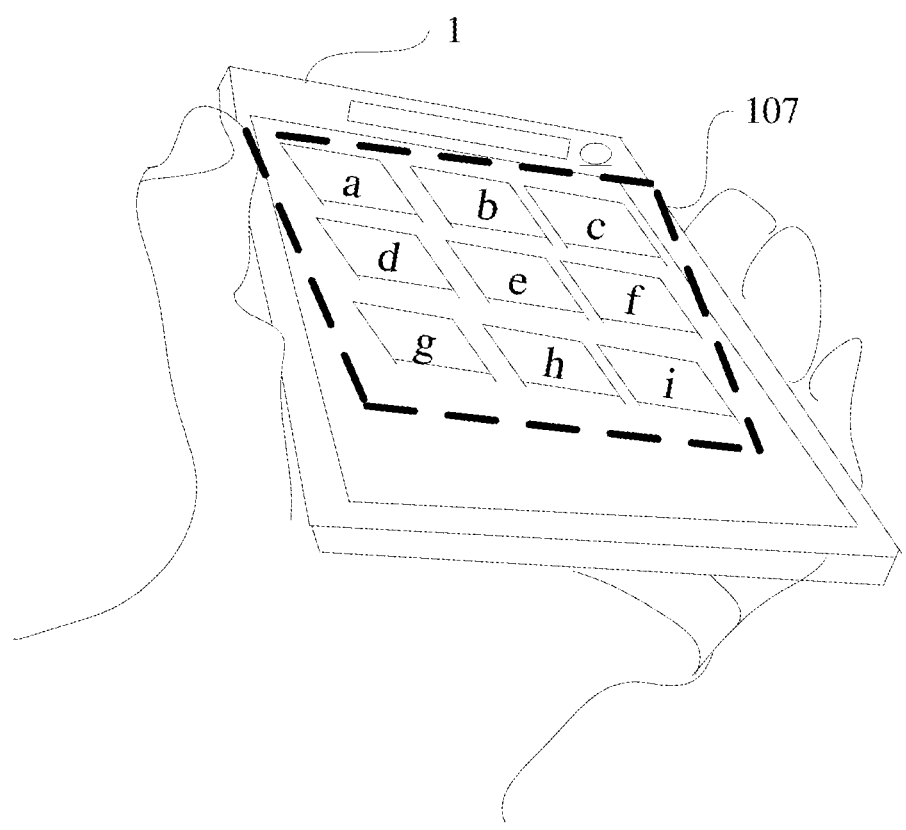
FIG. 8 is a first isometric diagram of an embodiment of displaying an application user interface when an electronic device is held horizontally by the left hand of a user.

If the acceleration value "x" is greater than the first acceleration threshold and the acceleration values "y" is greater than or equal to the second acceleration threshold, a third handheld gesture that represents the electronic device 1 is vertically handheld by a left hand is determined. If the acceleration value "x" is less than or equal to the first acceleration threshold and the acceleration value "y" is greater than the second acceleration threshold, a fourth handheld gesture that represents the electronic device 1 is horizontally handheld by the left hand is determined. (e.g. as shown in FIG. 8). In other embodiments, the handheld gesture may be determined according to the acceleration values "x", "y" and "z" or according to other determination methods.

In block 304, the calculation module 104 calculates a screen size of the touchscreen 40 according to a resolution of the touchscreen 40, and further calculates a reduction proportion of the user interface of the specified application program. The resolution of the touchscreen 40 includes horizontal pixels "w" and vertical pixels "h", and the screen size is described by the length of the diagonal "S" of the touchscreen 40. In one embodiment, the screen size can be calculated by a preset formula of "$S=\sqrt{W^2+H^2}$". In the preset formula, "W" represents a width (in inches) of the touchscreen 40, and "H" is the height (in inches) of the touchscreen 40 (as shown in FIG. 5). "W" is calculated by dividing the horizontal pixels "w" by a number of horizontal pixels per inch (PPI), and "H" is calculated by dividing the vertical pixels "h" by a number of vertical PPI. In other embodiments, the screen size can be calculated by other calculation methods.

After the screen size of the touchscreen 40 is calculated, the calculation module 104 further calculates a reduction level "L" of the user interface of the specified application program according to the screen size and a formula of "$L=(S-S_0)/\lambda$". In the formula, "S" represents the screen size, "$S_0$" represents a reference value to measure the screen size, and "$\lambda$" represents an increment of the screen size. Both "$S_0$" and "$\lambda$" are preset constants. For example, "$S_0$" can be preset to be a constant "4.6", and "$\lambda$" can be preset to be a constant "0.3". In one embodiment, "L" is calculated as an integer by deleting numerals after a decimal point, in a calculated result of "L".

The calculation module 104 further calculates the reduction proportion "P" according to a formula of "$P=P_0-\delta \times L$". In the formula, "$P_0$" represents an initial reduction proportion of the user interface of the specified application program when the screen size is equal to the reference value "$S_0$". "$\delta$" represents a decrement of the reduction proportion. Both "$P_0$" and "$\delta$" are preset constants. In one embodiment, "$P_0$" can be preset to be a constant "80%", and "$\delta$" can be preset to be a constant "5%".

As shown in FIG. 10, when a screen size of the touchscreen 40 is equal to 4.6, a reduction level of the user interface is equal to level 0 and a reduction proportion is equal to 80%. When the screen size is increased by increments of 0.3 inches, a reduction level of one level is applied. In other embodiments, the reduction proportions corresponding to different screen sizes may be preset to be the same. The above-mentioned constants "$S_0$", "$\lambda$", "$P_0$" and "$\delta$" also can be modified according to actual requirements.

In block 305, the confirmation module 105 confirms a new location of the user interface on the touchscreen 40 according to the determined handheld gesture. In one embodiment, when the handheld gesture is determined to be the first handheld gesture, a first new location (e.g. at lower right region on the touchscreen 40) corresponding to the first handheld gesture is confirmed. When the handheld gesture is determined to be the second handheld gesture, a second new location (e.g. at upper right region on the touchscreen 40) corresponding to the second handheld gesture is confirmed.

When the handheld gesture is determined to be the third handheld gesture, a new location (e.g. at lower left region on the touchscreen 40) corresponding to the third handheld gesture is confirmed. When the handheld gesture is determined to be the fourth handheld gesture, a fourth new location (e.g. at upper left region on the touchscreen 40)

corresponding to the fourth handheld gesture is confirmed. Relations between handheld gestures and the new locations can be added, modified, or canceled.

Figure 7:
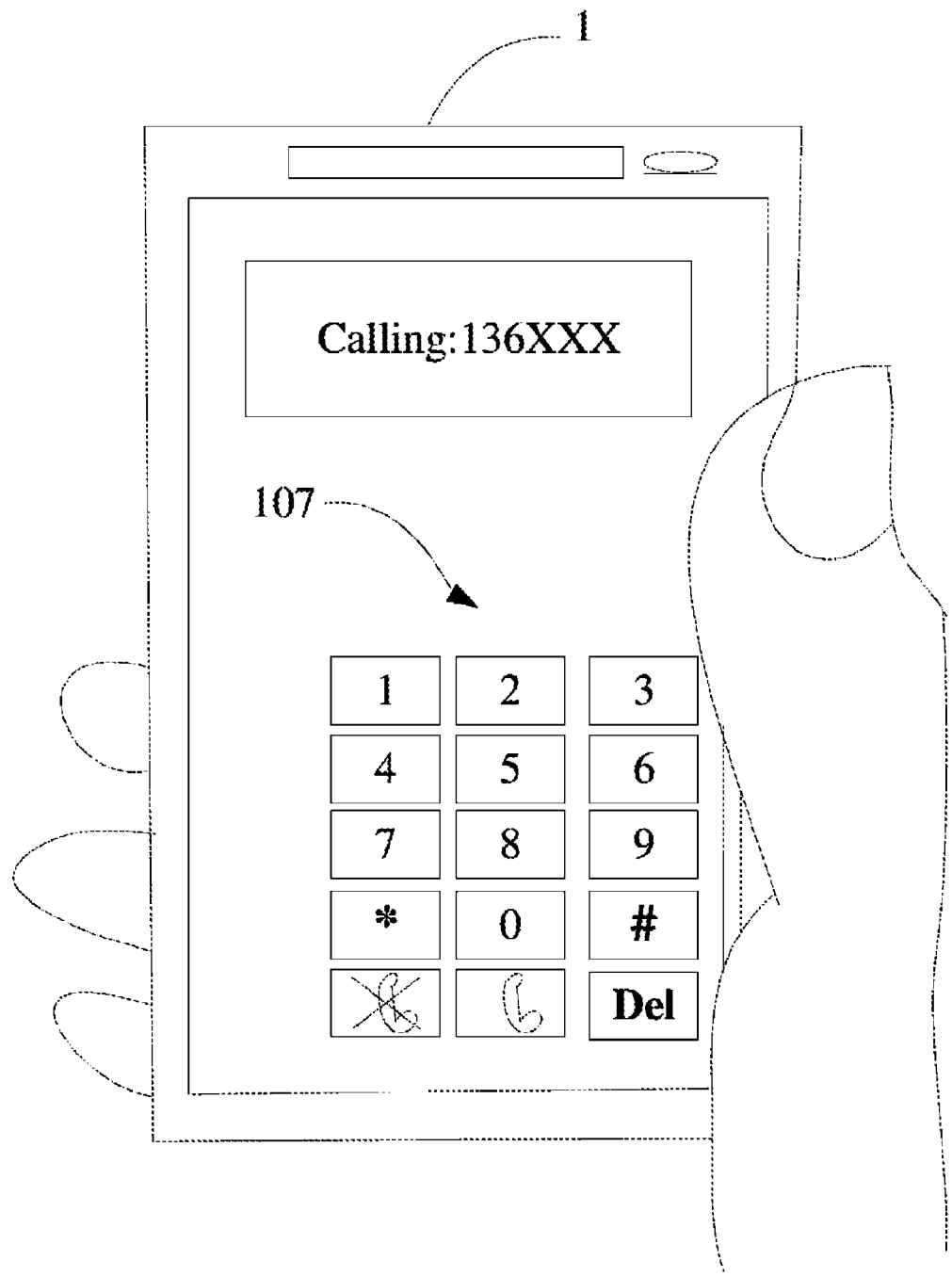
FIG. 7 is a second isometric diagram of an embodiment of displaying a dialing user interface when an electronic device is held vertically by the right hand of a user.
Figure 9:
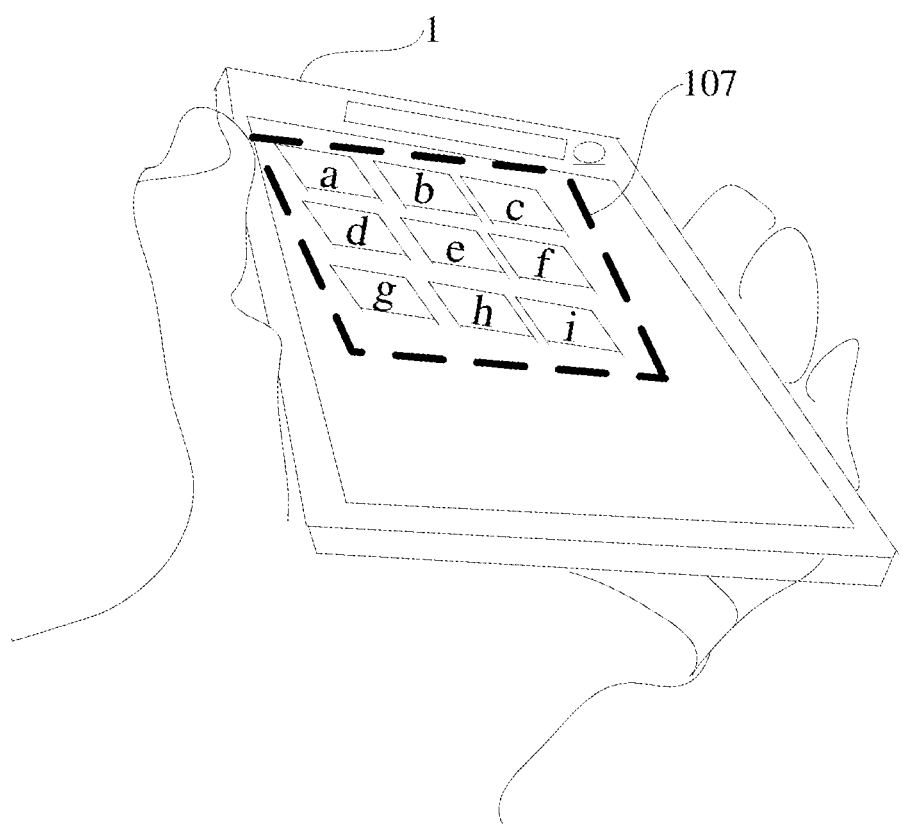
FIG. 9 is a second isometric diagram of an embodiment of displaying an application user interface when an electronic device is held horizontally by the left hand of a user.

In block 306, the adjustment module 106 resizes the user interface according to the calculated reduction proportion, and adjusts a display of the resized user interface according to the confirmed new location. For example, when the electronic device 1 is handheld vertically by the right hand (as shown in FIG. 6), the adjustment module 106 displays the resized user interface at the lower right region on the touchscreen 40 (as shown in FIG. 7). When the electronic device 1 is handheld horizontally by the left hand (as shown in FIG. 8), the adjustment module 106 displays the resized user interface at the upper left region on the touchscreen 40 (as shown in FIG. 9).

All of the processes described above may be embodied in, and fully automated via, functional code modules executed by one or more general purpose processors such as the processor 20. The code modules may be stored in any type of non-transitory readable medium or other storage device such as the storage device 30. Some or all of the methods may alternatively be embodied in specialized hardware. Depending on the embodiment, the non-transitory readable medium can be a hard disk drive, a compact disc, a digital versatile disc, a tape drive, or other storage medium.

The described embodiments are merely examples of implementations, and have been set forth for a clear understanding of the principles of the present disclosure. Variations and modifications may be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. An electronic device, comprising:
a touchscreen;
a three-axis accelerometer;
at least one processor; and
a storage device storing one or more programs, which when executed by the at least one processor, cause the at least one processor to:
activate the three-axis accelerometer to detect three-axis acceleration values of the electronic device;
determine a handheld gesture of the electronic device according to the detected three-axis acceleration values;
calculate a screen size of the touchscreen and calculate a reduction proportion for a user interface displayed on the touchscreen according to the calculated screen size;
confirm a new location of the user interface on the touchscreen according to the determined handheld gesture; and
resize the user interface according to the calculated reduction proportion, and adjust a display of the resized user interface according to the confirmed new location;
wherein the determining of the handheld gesture comprises:
determining a first handheld gesture that represents the electronic device is vertically handheld by a right hand, when an acceleration value "x" is greater than a first acceleration threshold and an acceleration values "y" is less than or equal to a second acceleration threshold based on a predetermined coordinate system comprising an x-axis and a y-axis;
determining a second handheld gesture that represents the electronic device is horizontally handheld by the right hand, when the acceleration value "x" is greater than or equal to the first acceleration threshold and the acceleration value "y" is less than a negative value of the second acceleration threshold;
determining a third handheld gesture that represents the electronic device is vertically handheld by a left hand, when the acceleration value "x" is greater than the first acceleration threshold and the acceleration values "y" is greater than or equal to the second acceleration threshold; or
determining a fourth handheld gesture that represents the electronic device is horizontally handheld by the left hand when the acceleration value "x" is less than or equal to the first acceleration threshold and the acceleration value "y" is greater than the second acceleration threshold.

2. The electronic device according to claim 1, wherein the at least one processor further:
selects one or more application programs in the electronic device, whose user interfaces are required to be adjusted by enabling an adjustment function.

3. The electronic device according to claim 1, wherein the new location is confirmed by:
confirming a first new location on the touchscreen when the handheld gesture is determined to be the first handheld gesture;
confirming a second new location on the touchscreen when the handheld gesture is determined to be the second handheld gesture;
confirming a third new location on the touchscreen when the handheld gesture is determined to be the third handheld gesture; or
confirming a fourth new location on the touchscreen when the handheld gesture is determined to be the fourth handheld gesture.

4. The electronic device according to claim 1, wherein the reduction proportion is calculated by:
calculating a reduction level "L" of the user interface according to the screen size and a first formula "L=(S−$S_0$)/λ", "S" representing the screen size, "$S_0$" representing a reference value to measure the screen size, and "λ" representing an increment of the screen size, both "$S_0$" and "λ" being preset constants; and
calculating the reduction proportion "P" according to a second formula "P=$P_0$−δ×L", "$P_0$" representing an initial reduction proportion when the screen size is equal to the reference value "$S_0$", "δ" representing a decrement of the reduction proportion, both "$P_0$" and "δ" being preset constants.

5. A method for adjusting a user interface using an electronic device, the electronic device comprising a three-axis accelerometer, the method comprising:
activating the three-axis accelerometer to detect three-axis acceleration values of the electronic device;
determining a handheld gesture of the electronic device according to the detected three-axis acceleration values;
calculating a screen size of a touchscreen of the electronic device and calculating a reduction proportion for the user interface displayed on the touchscreen according to the calculated screen size;
confirming a new location of the user interface on the touchscreen according to the determined handheld gesture; and resizing the user interface according to the calculated reduction proportion, and adjusting a display of the resized user interface according to the confirmed new location;

wherein the determining of the handheld gesture comprises:

determining a first handheld gesture that represents the electronic device is vertically handheld by a right hand, when an acceleration value "x" is greater than a first acceleration threshold and an acceleration values "y" is less than or equal to a second acceleration threshold based on a predetermined coordinate system comprising an x-axis and a y-axis;

determining a second handheld gesture that represents the electronic device is horizontally handheld by the right hand, when the acceleration value "x" is greater than or equal to the first acceleration threshold and the acceleration value "y" is less than a negative value of the second acceleration threshold;

determining a third handheld gesture that represents the electronic device is vertically handheld by a left hand, when the acceleration value "x" is greater than the first acceleration threshold and the acceleration values "y" is greater than or equal to the second acceleration threshold; or determining a fourth handheld gesture that represents the electronic device is horizontally handheld by the left hand when the acceleration value "x" is less than or equal to the first acceleration threshold and the acceleration value "y" is greater than the second acceleration threshold.

6. The method according to claim 5, further comprising:
selects one or more application programs in the electronic device, whose user interfaces are required to be adjusted by enabling an adjustment function.

7. The method according to claim 5, further comprising:
confirming a first new location on the touchscreen when the handheld gesture is determined to be the first handheld gesture;
confirming a second new location on the touchscreen when the handheld gesture is determined to be the second handheld gesture;
confirming a third new location on the touchscreen when the handheld gesture is determined to be the third handheld gesture;
confirming a fourth new location on the touchscreen when the handheld gesture is determined to be the fourth handheld gesture.

8. The method according to claim 5, wherein the reduction proportion is calculated by:
calculating a reduction level "L" of the user interface according to the screen size and a first formula "$L=(S-S_0)/\lambda$", "S" representing the screen size, "$S_0$" representing a reference value to measure the screen size, and "$\lambda$" representing an increment of the screen size, both "$S_0$" and "$\lambda$" being preset constants;
calculating the reduction proportion "P" according to a second formula "$P=P_0-\delta \times L$", "$P_0$" representing an initial reduction proportion when the screen size is equal to the reference value "$S_0$", "$\delta$" representing a decrement of the reduction proportion, both "$P_0$" and "$\delta$" being preset constants.

9. A non-transitory storage medium having stored thereon instructions that, when executed by at least one processor of an electronic device, cause the processor to perform a method for adjusting a user interface using the electronic devices, the electronic device comprising a three-axis accelerometer, the method comprising:

activating the three-axis accelerometer to detect three-axis acceleration values of the electronic device;
determining a handheld gesture of the electronic device according to the detected three-axis acceleration values;
calculating a screen size of a touchscreen of the electronic device and calculating a reduction proportion for the user interface displayed on the touchscreen according to the calculated screen size;
confirming a new location of the user interface on the touchscreen according to the determined handheld gesture; and
resizing the user interface according to the calculated reduction proportion, and adjusting a display of the resized user interface according to the confirmed new location;

wherein the determining of the handheld gesture comprises:

determining a first handheld gesture that represents the electronic device is vertically handheld by a right hand, when an acceleration value "x" is greater than a first acceleration threshold and an acceleration values "y" is less than or equal to a second acceleration threshold based on a predetermined coordinate system comprising an x-axis and a y-axis;

determining a second handheld gesture that represents the electronic device is horizontally handheld by the right hand, when the acceleration value "x" is greater than or equal to the first acceleration threshold and the acceleration value "y" is less than a negative value of the second acceleration threshold;

determining a third handheld gesture that represents the electronic device is vertically handheld by a left hand, when the acceleration value "x" is greater than the first acceleration threshold and the acceleration values "y" is greater than or equal to the second acceleration threshold; or determining a fourth handheld gesture that represents the electronic device is horizontally handheld by the left hand when the acceleration value "x" is less than or equal to the first acceleration threshold and the acceleration value "y" is greater than the second acceleration threshold.

10. The storage medium according to claim 9, further comprising:
selects one or more application programs in the electronic device, whose user interfaces are required to be adjusted by enabling an adjustment function.

11. The storage medium according to claim 9, further comprising:
confirming a first new location on the touchscreen when the handheld gesture is determined to be the first handheld gesture;
confirming a second new location on the touchscreen when the handheld gesture is determined to be the second handheld gesture;
confirming a third new location on the touchscreen when the handheld gesture is determined to be the third handheld gesture;
confirming a fourth new location on the touchscreen when the handheld gesture is determined to be the fourth handheld gesture.

12. The storage medium according to claim 9, wherein the reduction proportion is calculated by:
calculating a reduction level "L" of the user interface according to the screen size and a first formula "$L=(S-S_0)/\lambda$", "S" representing the screen size, "$S_0$" representing a reference value to measure the screen size, and "$\lambda$" representing an increment of the screen size, both "$S_0$" and "$\lambda$" being preset constants;

calculating the reduction proportion "P" according to a second formula "$P=P_0-\delta \times L$", "$P_0$" representing an initial reduction proportion when the screen size is equal to the reference value "$S_0$", "$\delta$" representing a decrement of the reduction proportion, both "$P_0$" and "$\delta$" being preset constants.

* * * * *